(12) United States Patent
Zhang et al.

(10) Patent No.: US 12,062,967 B2
(45) Date of Patent: Aug. 13, 2024

(54) STRUCTURE SELF-ADJUSTING TYPE VEHICLE-MOUNTED FLYWHEEL BATTERY COPING WITH MULTIPLE OPERATION MODES AND OPERATING METHOD THEREOF

(71) Applicant: JIANGSU UNIVERSITY, Zhenjiang (CN)

(72) Inventors: Weiyu Zhang, Zhenjiang (CN); Xiaoxiao Zhang, Zhenjiang (CN); Junjie Cui, Zhenjiang (CN); Xiaowei Gu, Zhenjiang (CN); Long Shan, Zhenjiang (CN); Yanjun Yu, Zhenjiang (CN); Xiaoyan Diao, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/007,747

(22) PCT Filed: Jan. 20, 2022

(86) PCT No.: PCT/CN2022/072909
§ 371 (c)(1),
(2) Date: Dec. 2, 2022

(87) PCT Pub. No.: WO2023/130509
PCT Pub. Date: Jul. 13, 2023

(65) Prior Publication Data
US 2024/0235321 A1    Jul. 11, 2024

(30) Foreign Application Priority Data
Jan. 4, 2022    (CN) .......................... 202210005508.5

(51) Int. Cl.
*F16F 15/31*    (2006.01)
*F16C 32/04*    (2006.01)
(Continued)

(52) U.S. Cl.
CPC ............. *H02K 7/025* (2013.01); *F16F 15/31* (2013.01)

(58) Field of Classification Search
CPC .......... F16F 15/31; F16F 15/30; F16F 15/315; F16F 15/3156; H02K 7/025; H02K 7/02;
(Continued)

(56) References Cited

U.S. PATENT DOCUMENTS

| 3,526,795 A | * | 9/1970 | Pecs | ........................ B64G 1/283 310/67 R |
| 6,624,542 B1 | * | 9/2003 | Gabrys | ................. F16C 37/005 310/74 |

(Continued)

FOREIGN PATENT DOCUMENTS

| CN | 108683292 A | 10/2018 |
| CN | 112165210 A | 1/2021 |
| CN | 113422467 A | 9/2021 |

*Primary Examiner* — Michael Andrews
(74) *Attorney, Agent, or Firm* — Bayramoglu Law Offices LLC

(57) ABSTRACT

A structure self-adjusting type vehicle-mounted magnetic suspension flywheel battery coping with multiple operation modes and an operating method thereof are provided. An ant-nest type channel is formed in a radiator of the flywheel battery along a circumferential direction, and a plurality of counterweight magnetic adsorption devices are symmetrically embedded in a flywheel lower sphere. When the flywheel battery operates in a charging mode, a standby mode or a discharging mode, the operation mode of the motor is flexibly changed according to different recovered energy levels or output energy levels, and the loss in the magnetic bearing system is reduced through matching of different types of magnetic bearings according to different disturbance levels. The low-loss, high-safety and stable operation of the vehicle-mounted magnetic suspension flywheel battery in various operation modes can be realized.

9 Claims, 5 Drawing Sheets

(51) Int. Cl.
*H02K 7/02* (2006.01)
*H02K 7/09* (2006.01)

(58) Field of Classification Search
CPC ..... H02K 7/09; F16C 32/044; F16C 32/0444; F16C 32/0408; F16C 32/0417; H02J 3/30; H02J 15/007
USPC .......................................................... 310/74
See application file for complete search history.

(56) References Cited

U.S. PATENT DOCUMENTS

| | | | |
|---|---|---|---|
| 6,710,489 B1* | 3/2004 | Gabrys | F16C 32/0476 |
| | | | 310/90 |
| 9,083,207 B1* | 7/2015 | Veltri | H02K 7/025 |
| 2017/0126087 A1* | 5/2017 | Soderberg | H02K 1/2792 |

\* cited by examiner

STRUCTURE SELF-ADJUSTING TYPE VEHICLE-MOUNTED FLYWHEEL BATTERY COPING WITH MULTIPLE OPERATION MODES AND OPERATING METHOD THEREOF

CROSS REFERENCE TO THE RELATED APPLICATIONS

This application is the national phase entry of International Application No. PCT/CN2022/072909, filed on Jan. 20, 2022, which is based upon and claims priority to Chinese Patent Application No. 202210005508.5, filed on Jan. 4, 2022, the entire contents of which are incorporated herein by reference.

TECHNICAL FIELD

The present disclosure relates to the technical field of flywheel batteries, and specifically to a structure self-adjusting type vehicle-mounted flywheel battery coping with multiple operation modes and an operating method thereof.

BACKGROUND

Vehicle-mounted magnetic suspension flywheel batteries have become a power battery with great development potential in the field of electric vehicles due to the advantages of high energy conversion efficiency, no pollution, and long service life. Using the vehicle-mounted magnetic suspension flywheel battery as an auxiliary power source in combination with the built-in power battery of the electric vehicle to form a hybrid power system can make use of the advantages of the two power sources, thereby optimizing the energy utilization efficiency, improving the power performance of the electric vehicle, and increasing the mile range of the electric vehicle. In addition, the addition of the vehicle-mounted magnetic suspension flywheel battery can reduce the charge/discharge current of the built-in power battery, thus protecting the battery and prolonging its service life. For the vehicle-mounted magnetic suspension flywheel battery system, flywheel motor and magnetic bearing technology are two key technologies that affect its overall performance. The vehicle-mounted magnetic suspension flywheel battery generally needs to operate in multiple operation modes such as charging mode, standby mode and discharging mode, and has different requirements for the magnetic bearing system and the flywheel motor in different operation modes. Specifically, (1) Charging mode. When the electric vehicle goes downhill or brakes, the vehicle-mounted magnetic suspension flywheel battery recovers the braking energy of the electric vehicle. In order to reduce the large current impact of the braking energy on the built-in power battery, the vehicle-mounted magnetic suspension flywheel battery is in the charging mode. In this case, the flywheel motor needs to provide a large starting torque. Especially, a metal flywheel requires the flywheel motor to provide a larger starting torque. The purpose is to enable the flywheel battery system to make a faster response and store energy as quickly as possible while the flywheel is storing energy. For the magnetic bearing system in this operation mode, due to the great disturbance caused on the flywheel by the driving state of the vehicle, there is a high requirement for the anti-disturbance and low control loss of the magnetic bearing system, which can improve the efficiency of the flywheel battery system. In addition, although the vacuum environment can reduce the air resistance received by the flywheel and allows the flywheel speed to increase rapidly, the problem of poor heat dissipation is caused. Once the flywheel fails due to metal fatigue, metal breakage, etc., the resistance-free vacuum environment adversely affects the safety of the flywheel battery system.

(2) Standby mode. When the electric vehicle is running normally (in which case the required power is relatively low), the built-in power battery alone provides energy, and the vehicle-mounted magnetic suspension flywheel battery is in the standby mode. In this process, the flywheel rotates at a high speed and stores kinetic energy. The flywheel switches to a low-voltage mode after reaching a certain rotational speed. In this case, the loss in the flywheel motor should be at a minimum level and the rotational speed of the flywheel should be maintained. For the magnetic bearing system in this operation mode, since the driving state of the vehicle has little disturbance on the flywheel, the main function of the magnetic bearing system is to bear the flywheel. In this case, the magnetic bearing system needs to have a low offset loss characteristic, in order to improve the efficiency of the flywheel battery system.

(3) Discharging mode. When the electric vehicle starts or accelerates (in which case the vehicle requires a very large instantaneous power), the vehicle-mounted magnetic suspension flywheel battery and the built-in power battery jointly provide energy. In this case, the vehicle-mounted magnetic suspension flywheel battery is in the discharging mode and transforms mechanical energy into electrical energy. The discharging mode is the process in which the flywheel battery system outputs energy to the outside. The high-speed rotating flywheel transforms the kinetic energy of the flywheel into electrical energy through a generator, and transforms the electrical energy through a power electronic device to meet the electricity requirements of the electric vehicle. In this process, the flywheel motor operates as a generator. For the magnetic bearing system in this operation mode, since the driving state of the vehicle has great disturbance on the flywheel, the anti-disturbance and the low control loss characteristic of the magnetic bearing system are very important for improving the efficiency of the flywheel battery system.

To sum up, flywheel battery systems with different operation modes have different requirements for the flywheel motor, the magnetic bearing system, and the vacuum housing. If the flywheel battery system is designed according to a single operation mode alone, there will be significantly different design requirements. For example, under vehicle-mounted operating conditions such as starting, accelerating, braking, going uphill and downhill, in order to meet the dual demands of the power system for energy and power, high-power transmission is required. When the flywheel battery is in the standby mode, the flywheel battery needs to maintain operation with extremely low energy consumption and does not require high power. If the flywheel battery system is not accurately designed according to the operation modes, it is difficult for the flywheel battery system to achieve a good balance in terms of energy consumption, safety and stability, and energy storage performance, and the optimal performance advantages of the flywheel battery system cannot be achieved.

SUMMARY

To overcome the drawbacks in the prior art, the present disclosure provides a structure self-adjusting type vehicle-mounted flywheel battery coping with multiple operation modes and an operating method thereof, to realize the low-loss, high-safety and stable operation of the vehicle-mounted magnetic suspension flywheel battery in various operation modes.

The above technical object of the present disclosure is attained with the following technical means.

A structure self-adjusting type vehicle-mounted flywheel battery coping with multiple operation modes is provided, including a vacuum housing, wherein a radiator, a flywheel axial magnetic bearing stator yoke, a flywheel, and a counterweight are sequentially arranged inside the vacuum housing from top to bottom;

an ant-nest type channel is formed in the radiator along a circumferential direction, a coolant is stored in the channel, an upper part of the channel is connected with a heat dissipation piece, and an end of the heat dissipation piece is arranged outside the vacuum housing;

a plurality of counterweight magnetic adsorption devices are symmetrically embedded in a lower sphere of the flywheel, each of the counterweight magnetic adsorption devices includes a magnetic isolation sleeve, a permanent magnet, a spring and a resin cover, the magnetic isolation sleeve is embedded in the lower sphere of the flywheel, the permanent magnet is arranged inside the magnetic isolation sleeve, the spring is arranged at a lower end of the permanent magnet, and the magnetic isolation sleeve is sealed by the resin cover;

a counterweight axial passive magnetic bearing lower permanent magnet is mounted on an upper surface of a bottom cover of the vacuum housing, the counterweight axial passive magnetic bearing lower permanent magnet and a counterweight axial passive magnetic bearing upper permanent magnet are coaxial and are spaced apart from each other, and the counterweight axial passive magnetic bearing lower permanent magnet and the counterweight axial passive magnetic bearing upper permanent magnet constitute a counterweight axial passive magnetic bearing;

a flywheel motor stator core is coaxially arranged outside the radiator, a motor is arranged on the flywheel motor stator core, and a radial magnetic resistance magnetic bearing and a radial Lorentz force magnetic bearing are arranged inside the flywheel;

a flywheel axial Lorentz force magnetic bearing stator yoke is fixed on a central axis of the flywheel axial magnetic bearing stator yoke, a flywheel axial Lorentz force magnetic bearing control coil is wound on the flywheel axial Lorentz force magnetic bearing stator yoke, and the flywheel axial Lorentz force magnetic bearing control coil and the axial Lorentz force magnetic bearing permanent magnet constitute a flywheel axial Lorentz force magnetic bearing;

a flywheel axial passive magnetic bearing upper permanent magnet is embedded in a lower end of the flywheel axial magnetic bearing stator yoke, and the flywheel axial passive magnetic bearing upper permanent magnet and the flywheel axial passive magnetic bearing lower permanent magnet constitute a flywheel axial passive suction magnetic bearing; and a flywheel axial Halbach axial passive magnetic bearing is mounted in a center of the bottom cover of the vacuum housing.

In the above technical solution, the motor is a first flywheel motor and a second flywheel motor, and internal air gaps of the first flywheel motor and the second flywheel motor are cone-shaped; and the first flywheel motor and the second flywheel motor have an identical radial air gap length, and a rated power of the first flywheel motor is smaller than that of the second flywheel motor.

In the above technical solution, the motor is a third flywheel motor, and a permanent magnet of the first flywheel motor and a coil of the second flywheel motor are axially coupled in an axial direction, and have a cone-shaped air gap in a radial direction.

In the above technical solution, the motor is a first flywheel generator and a second flywheel generator, and internal air gaps of the first flywheel generator and the second flywheel generator are cone-shaped; and the first flywheel generator and the second flywheel generator have an identical radial air gap length, and an output voltage level of the first flywheel generator is lower than that of the second flywheel generator.

In the above technical solution, an upper universal spherical bearing and a lower universal spherical bearing are radially arranged on the counterweight, a radial air gap exists between the upper universal spherical bearing and the counterweight, and a radial air gap exists between the lower spherical bearing and the counterweight.

In the above technical solution, an upper cover of the vacuum housing is provided with a vacuum pumping pipeline and an air intake pipeline, and a solenoid valve is mounted at the air intake pipeline.

An operating method of the structure self-adjusting type vehicle-mounted flywheel battery coping with multiple operation modes is provided, including:

powering a coil of the first flywheel motor and a coil of the second flywheel motor at the same time when the flywheel battery system starts, to obtain a maximum starting torque;

powering the coil of the first flywheel motor alone when a recovered energy power is less than a rated power of the first flywheel motor;

powering the coil of the second flywheel motor alone when the recovered energy power is greater than the rated power of the first flywheel motor and less than a rated power of the second flywheel motor;

powering the coil of the first flywheel motor and the coil of the second flywheel motor at the same time when the recovered energy power is greater than the rated power of the second flywheel motor;

powering a control coil of the radial magnetic resistance magnetic bearing continuously, and powering a control coil of the radial Lorentz force magnetic bearing intermittently according to a disturbance intensity; and the flywheel axial passive suction magnetic bearing and the flywheel axial Lorentz force magnetic bearing operating in cooperation with each other.

An operating method of the structure self-adjusting type vehicle-mounted flywheel battery coping with multiple operation modes is provided, including:

drawing the counterweight to a bottom end of the flywheel by the counterweight magnetic adsorption device, so that a balanced state of the flywheel axial passive magnetic bearing and the flywheel axial Lorentz force magnetic bearing is broken, and the flywheel falls with the counterweight; at this moment the flywheel axial Halbach axial passive magnetic bearing operating to balance the flywheel battery in the axial direction; and powering a control coil of the radial magnetic resistance magnetic bearing continuously, and not powering a control coil of the radial Lorentz force magnetic bearing.

An operating method of the structure self-adjusting type vehicle-mounted flywheel battery coping with multiple operation modes is provided, including:

releasing the counterweight from a bottom end of the flywheel by the counterweight magnetic adsorption device, so that a balanced state of the flywheel Halbach axial passive magnetic bearing is broken, and the flywheel moves upward to restore an axial balance;

outputting energy of different voltage levels to a vehicle control circuit and a traction system by the first flywheel generator and the second flywheel generator respectively;

powering a control coil of the radial magnetic resistance magnetic bearing continuously, and powering a control coil of the radial Lorentz force magnetic bearing intermittently according to a disturbance intensity; and the flywheel axial passive suction magnetic bearing and the flywheel axial Lorentz force magnetic bearing operating in cooperation with each other.

Compared with the prior art, the present disclosure has the following beneficial effects.

(1) The present disclosure skillfully utilizes the physical phenomenon that the position of the counterweight magnetic adsorption device permanent magnet is changed due to the centrifugal force caused by the change of the rotational speed, and realizes self-adjustment during the change of the flywheel speed, so as to adapt to different flywheel battery structures. To be specific, the magnetic adsorption device sensitive to the rotational speed is designed for the flywheel counterweight. When the rotational speed of the flywheel reaches a particular rotational speed, the counterweight magnetic adsorption device automatically adsorbs or releases the flywheel counterweight to change the mass of the flywheel and therefore change the balanced state of the axial magnetic bearing and the structure of the flywheel motor, allowing the entire system to automatically adjust its own structure in response to different operation modes of the vehicle-mounted magnetic suspension flywheel battery.

(2) The first structure of the vehicle-mounted magnetic suspension flywheel battery designed by the present disclosure is suitable for the charging operation mode of the vehicle-mounted magnetic suspension flywheel battery. The flywheel motor system in this operation mode is used as a motor, and the magnetic suspension system uses a variety of magnetic bearings that operate in cooperation with each other, to overcome the disturbance caused by vehicle driving conditions and reduce the control loss. As permanent magnet synchronous motors, the first flywheel motor and the second flywheel motor of the flywheel motor system have the same radial air gap length and the same pole/slot ratio, and the first flywheel motor and the second flywheel motor have different axial lengths and different rated powers. A maximum starting torque can be outputted when the first flywheel motor and the second flywheel motor operate simultaneously. In addition, according to the braking strength and braking power, the first flywheel motor or the second flywheel motor can be flexibly adjusted to operate simultaneously or independently, so that the flywheel motor system can operate with low loss while meeting the system requirements. The charging mode mostly occurs when the electric vehicle is under a vehicle driving condition such as braking or driving downhill, in which case the flywheel suffers from great disturbance. To accurately suppress the disturbance and achieve low-loss operation, the radial magnetic resistance magnetic bearing, i.e., a hybrid magnetic bearing, is used for coarse adjustment of two degrees of freedom in the radial direction, and the radial Lorentz force magnetic bearing is used to achieve fine auxiliary adjustment, thereby improving the precision of radial disturbance control. For the axial magnetic bearings, the passive suction magnetic bearing is used to offset the flywheel weight, and the Lorentz force magnetic bearing is used for fine auxiliary adjustment.

(3) The second structure of the vehicle-mounted magnetic suspension flywheel battery designed by the present disclosure is suitable for the standby operation mode of the vehicle-mounted magnetic suspension flywheel battery. In this case, the flywheel motor system is used as a motor, and flux weakening is used to improve the operating efficiency, and the magnetic suspension system coordinates magnetic bearings of different degrees of freedom to improve the efficiency. Since the flywheel in this operation mode reaches a counterweight capture speed, the counterweight magnetic adsorption device permanent magnet is subjected to the centrifugal force, overcomes the elastic force of the spring to squeeze outward, and adsorbs the flywheel counterweight to the lower spherical surface of the flywheel, to increase the mass of the flywheel to cause the flywheel to move downward. The flywheel motor system is adjusted to a new third flywheel motor, and the third flywheel motor is used as a permanent magnet synchronous motor, which has the same pole/slot ratio as the first flywheel motor and the second flywheel motor. Since the overall air gap of the flywheel motor system is of a conical structure, the flywheel after the structural adjustment falls, so that the third flywheel motor has an increased air gap length and a reduced coupling area between the permanent magnet and the stator compared to the flywheel motor system of the structure in Embodiment 1. In this case, the third flywheel motor can realize flux weakening, and has a smaller loss than the flywheel motor system of the first structure of the vehicle-mounted magnetic suspension flywheel battery. Therefore, the operating efficiency of the flywheel motor system is improved. In this case, because the disturbance caused by the vehicle is small, only the Halbach passive magnetic bearing among the axial magnetic bearings and the radial magnetic resistance magnetic bearing among the radial magnetic bearings are used to reduce the loss of the system. In this way, not only the requirements of system disturbance suppression are met, but also the overall operating efficiency of the flywheel battery is improved.

(4) The third structure of the vehicle-mounted magnetic suspension flywheel battery designed by the present disclosure is suitable for the discharging operation mode of the vehicle-mounted magnetic suspension flywheel battery. During discharging of the flywheel battery, the rotational speed of the flywheel decreases, so that the centrifugal force received by the magnetic adsorption device permanent magnet is less than that of the spring. Therefore, the magnetic force of the counterweight permanent magnet on the counterweight disappears, the counterweight falls, the mass of the flywheel is reduced, and the flywheel motor returns to the first structure of the vehicle-mounted magnetic suspension flywheel battery. The flywheel motor system is adjusted to the first flywheel generator and the second flywheel generator, and the first flywheel generator and the second flywheel generator are used as permanent magnet synchronous generators with different output powers and output voltage levels. The discharging mode mostly occurs when the vehicle is under a vehicle driving condition such as accelerating or driving uphill, in which case the flywheel suffers from great disturbance. To accurately suppress the disturbance and achieve low-loss operation, the magnetic resistance magnetic bearing, i.e., a hybrid magnetic bearing, is used for coarse adjustment of two degrees of freedom in the radial direction, and the Lorentz force magnetic bearing is used to achieve auxiliary adjustment, thereby improving the precision of radial disturbance control. For the axial magnetic bearings, the passive suction magnetic bearing is used to offset the flywheel weight, and the Lorentz force magnetic bearing is used for auxiliary adjustment.

(5) In order to reduce the resistance of air to the flywheel, the present disclosure creates a vacuum environment in the housing cavity. In addition, since the vacuum environment cannot transmit heat, the present disclosure designs a radiator system to transfer the heat of the stator core of the motor to the outside of the housing through the radiator, so as to dissipate heat from the stator core and prevent the heat accumulation increasing the loss of the motor. In addition, the bionic ant-nest design is adopted, and the coolant channels are designed inside the radiator to improve the fluidity of the coolant and enhance the heat dissipation performance.

(6) The present disclosure also designs a separate stabilization device for the flywheel counterweight. When the flywheel counterweight has not been adsorbed to the flywheel, the flywheel counterweight is suspended at the bottom end of the housing under the action of the axial passive magnetic bearing and the universal spherical magnetic bearing, and will be adsorbed after the flywheel is accelerated. When the flywheel decelerates and the counterweight falls, the falling posture of the flywheel counterweight is corrected by the universal spherical bearing to make the flywheel counterweight suspended at a safe position, so as to prevent the high rotational speed from causing an over-speed failure.

(7) In order to ensure the safe and reliable operation of the overall system, the present disclosure provides a safety design. When an over-speed failure occurs in the flywheel, the solenoid valve located on the housing upper cover is opened to destroy the vacuum environment in the housing cavity and increase the air resistance received by the flywheel, so as to slow the flywheel down quickly.

(8) Under operating conditions such as starting, accelerating, braking, going uphill and downhill, in order to meet the dual demands of the power system for energy and power, high-power transmission is required. When the vehicle is steady, the flywheel battery needs to maintain operation with extremely low energy consumption and does not require high power. The flywheel battery system designed by the present disclosure can adaptively change its structure according to different operation modes of the flywheel battery under vehicle driving conditions, which not only achieve the optimal energy storage performance of the flywheel battery system, but also meets the low-energy operation requirements of the flywheel battery system, thereby significantly improving the energy storage efficiency of the flywheel battery system.

Figure 1:
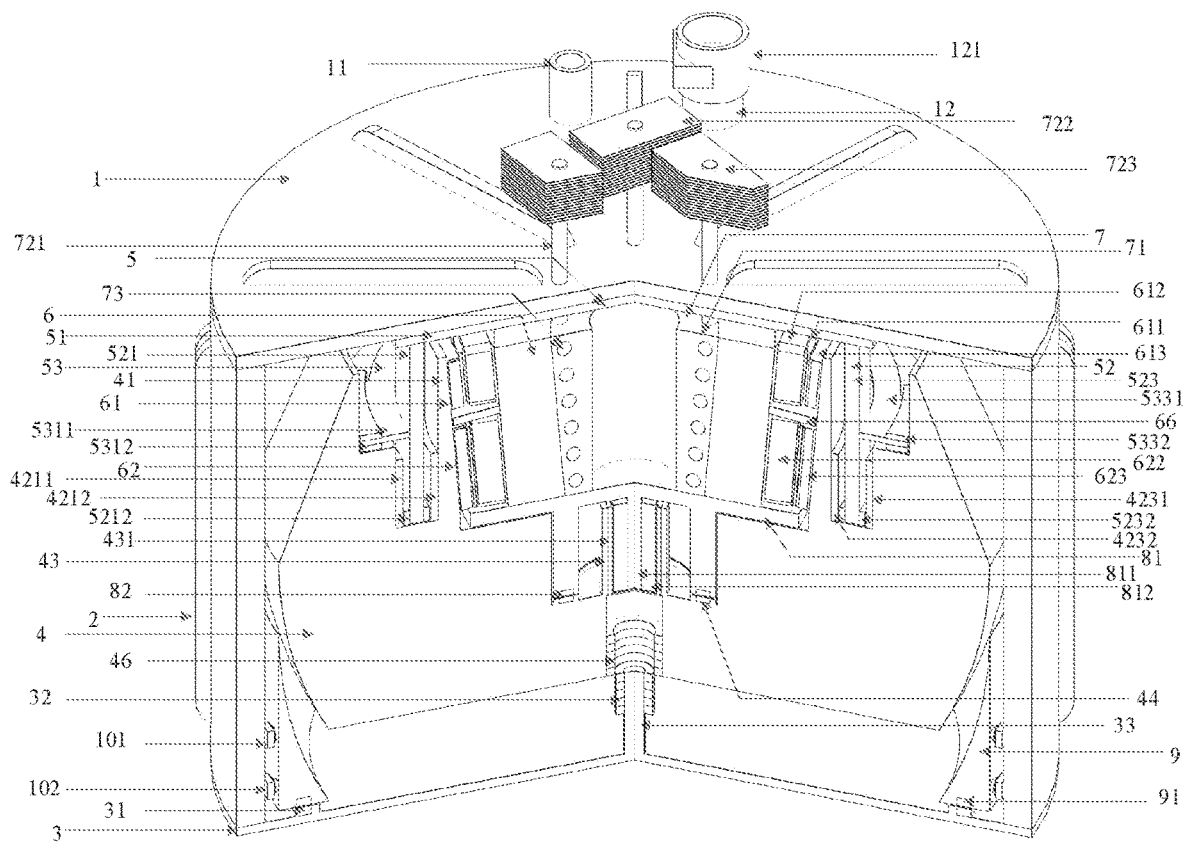
FIG. 1 is a cross-sectional view of a first structure of a vehicle-mounted magnetic suspension flywheel battery system according to the present disclosure.

In the drawings: 1—housing upper cover; 11—vacuum pumping pipeline; 12—air intake pipeline; 121—solenoid valve; 2—housing middle section; 3—housing bottom cover; 31—counterweight axial passive magnetic bearing lower permanent magnet; 32—flywheel axial Halbach axial passive magnetic bearing inner permanent magnet; 33—flywheel axial Halbach passive magnetic bearing stator yoke; 4—flywheel; 41—flywheel motor system rotor yoke; 42—radial magnetic resistance magnetic bearing mounting groove; 421—radial Lorentz force magnetic bearing mounting groove; 4211—first radial Lorentz force magnetic bearing permanent magnet; 4212—second radial Lorentz force magnetic bearing permanent magnet; 4221—third radial Lorentz force magnetic bearing permanent magnet; 4222—fourth radial Lorentz force magnetic bearing permanent magnet; 4231—fifth radial Lorentz force magnetic bearing permanent magnet; 4232—sixth radial Lorentz force magnetic bearing permanent magnet; 43—axial Lorentz force magnetic bearing rotor yoke; 431—axial Lorentz force magnetic bearing permanent magnet; 440—axial passive magnetic bearing permanent magnet mounting groove; 44—flywheel axial passive magnetic bearing lower permanent magnet; 45—counterweight magnetic adsorption device; 4511 counterweight magnetic adsorption device magnetic isolation sleeve; 4521—counterweight magnetic adsorption device permanent magnet; 4531—counterweight magnetic adsorption device spring; 4541—counterweight magnetic adsorption device resin cover; 460—flywheel axial Halbach passive magnetic bearing outer permanent magnet mounting groove; 46—flywheel axial Halbach axial passive magnetic bearing outer permanent magnet; 5—radial magnetic bearing; 51—radial magnetic bearing stator cover; 52—radial Lorentz force magnetic bearing; 521—first radial Lorentz force magnetic bearing stator yoke; 522—second radial Lorentz force magnetic bearing stator yoke; 523—third radial Lorentz force magnetic bearing stator yoke; 5212—first radial Lorentz force magnetic bearing control coil; 5222—second radial Lorentz force magnetic bearing control coil; 5232—third radial Lorentz force magnetic bearing control coil; 53—radial magnetic resistance magnetic bearing; 5311—first radial magnetic resistance magnetic bearing stator yoke; 5321—second radial magnetic resistance magnetic bearing stator yoke; 5331— third radial magnetic resistance magnetic bearing stator yoke; 5312—first radial magnetic resistance magnetic bearing control coil; 5322—second radial magnetic resistance magnetic bearing control coil; 5332—third radial magnetic resistance magnetic bearing control coil; 6—flywheel motor stator core; 61—first flywheel motor; 611—stator yoke of first flywheel motor; 612—motor coil of first flywheel; 613—permanent magnet of first flywheel motor; 62—second flywheel motor; 621—stator yoke of second flywheel motor; 622—coil of second flywheel motor; 623—permanent magnet of second flywheel motor; 63—third flywheel motor; 64—first flywheel generator; 65—second flywheel generator; 66 magnetic isolation aluminum ring; 7—radiator system; 71—radiator; 721—first heat dissipation piece; 722—second heat dissipation piece; 723—third heat dissipation piece; 724—fourth heat dissipation piece; 73—coolant; 8—axial magnetic bearing; 81—flywheel axial magnetic bearing stator yoke; 811—flywheel axial Lorentz force magnetic bearing stator yoke; 812—flywheel axial Lorentz force magnetic bearing control coil; 82—flywheel axial passive magnetic bearing upper permanent magnet; 9—counterweight; 91—counterweight axial passive magnetic bearing upper permanent magnet; 910—counterweight axial passive magnetic bearing upper permanent magnet mounting groove; 101—upper universal spherical bearing; 102—lower universal spherical bearing.

DETAILED DESCRIPTION OF THE EMBODIMENTS

The present disclosure will be further described in detail below with reference to drawings and embodiments, but the protection scope of the present disclosure is not limited thereto.

The present disclosure provides a structure self-adjusting type flywheel battery coping with multiple operation modes. When coping with different operation modes, the specific structure and operating method of the flywheel battery are as follows:

Embodiment 1

The structure of this embodiment is used when the vehicle-mounted magnetic suspension flywheel battery operates in a charging mode.

Figure 2:
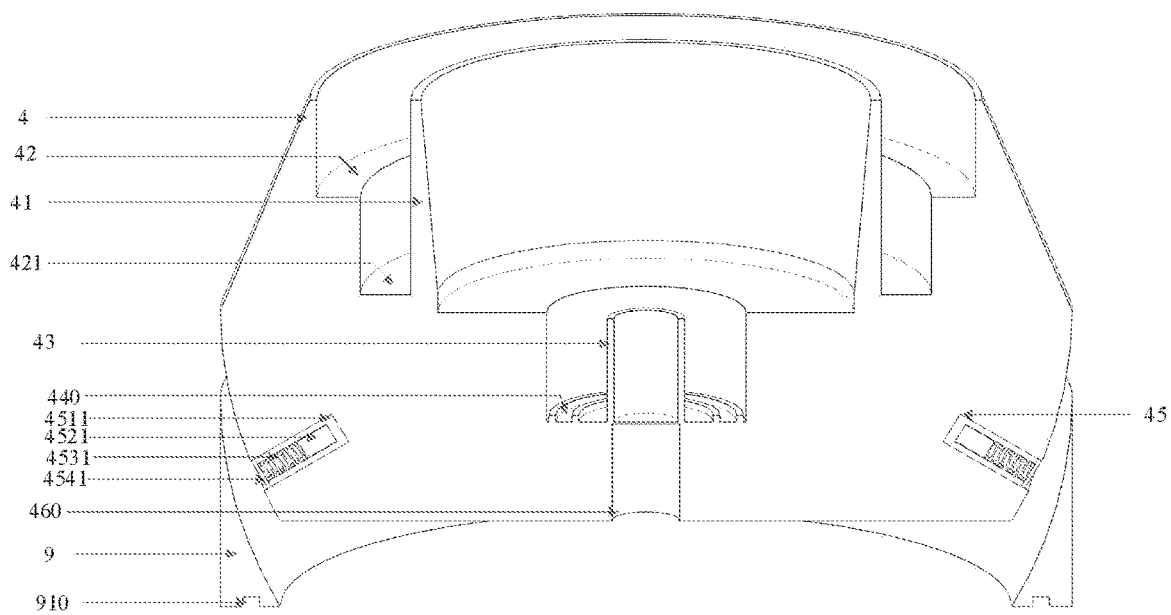
FIG. 2 is a partial structural diagram of a flywheel and a counterweight in the first structure of the vehicle-mounted magnetic suspension flywheel battery system according to the present disclosure.
Figure 9:
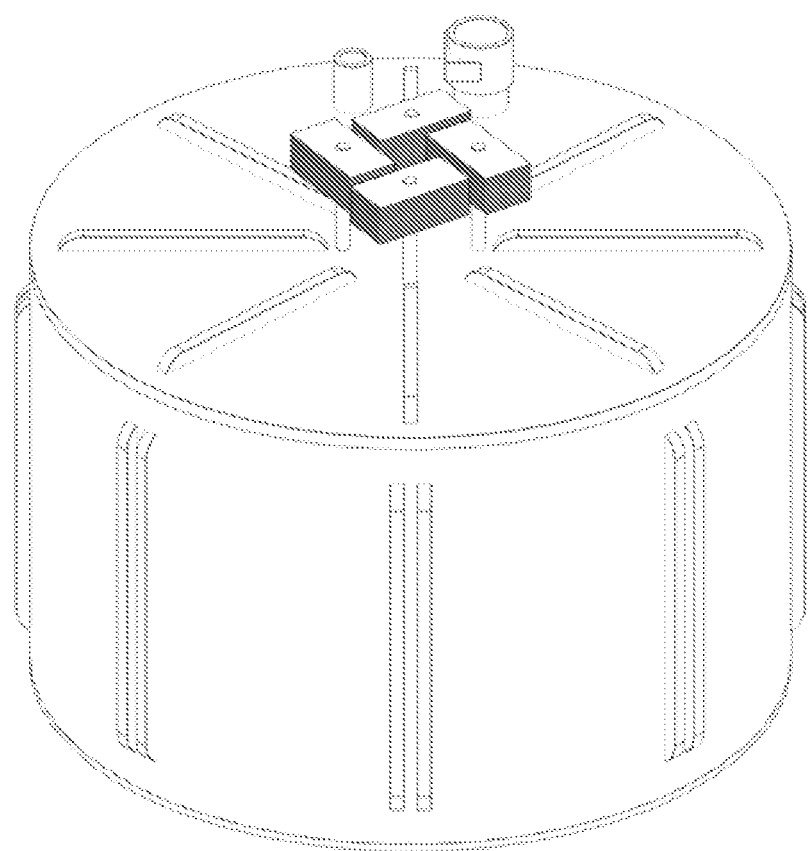
FIG. 9 is an overall structural diagram of the vehicle-mounted magnetic suspension flywheel battery system according to the present disclosure.

As shown in FIG. 1 and FIG. 2, the present disclosure designs a structure self-adjusting type flywheel battery system coping with multiple operation modes, including a vacuum housing (as shown in FIG. 9) consisting of a housing upper cover 1, a housing middle section 2 and a housing bottom cover 3 that are detachably connected. A radial magnetic bearing stator cover 51 is fixed on the bottom of the housing upper cover 1. A flywheel motor stator core 6 is fixed on the bottom of the radial magnetic bearing stator cover 51. A flywheel 4 is arranged in the vacuum housing coaxially with the flywheel motor stator core 6. The housing upper cover 1 is provided with a vacuum pumping pipeline 11 and an air intake pipeline 12. The vacuum pumping pipeline 11 is connected to an external vacuum air pump. A solenoid valve 121 is mounted at the air intake pipeline 12.

Figure 8:
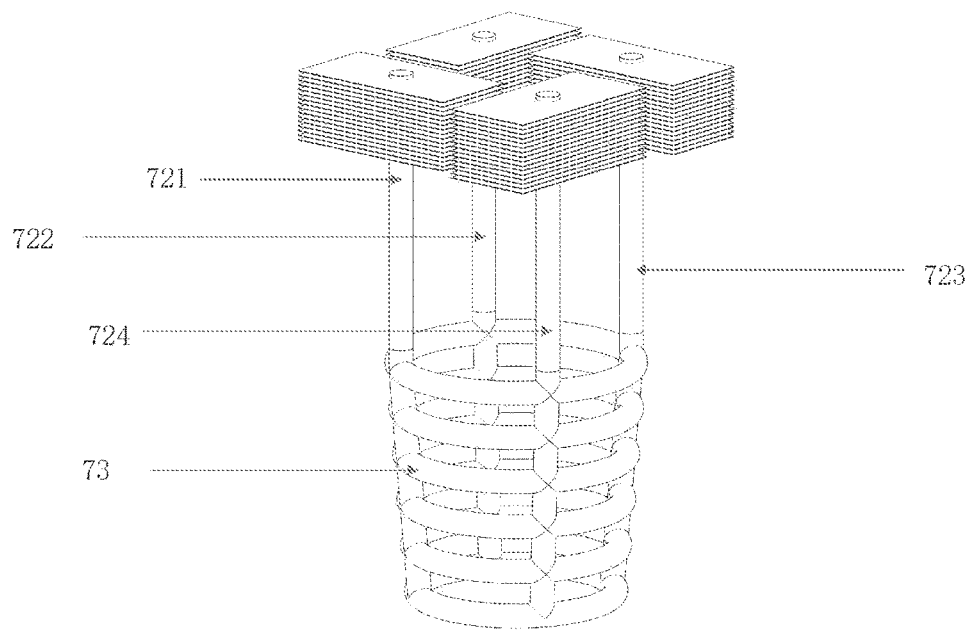
FIG. 8 is a schematic diagram of internal channels of a radiator of the vehicle-mounted magnetic suspension flywheel battery according to the present disclosure.

An outer wall of a radiator 71 tightly fits to an interior of the flywheel motor stator core 6. Referring to FIG. 8, a plurality of channels in communication with each other are arranged inside the radiator 71 along a circumferential direction, and the channels are in the form of ant nests. A coolant 73 is stored in the channels. The coolant 73 is a liquid metal. Evenly distributed heat dissipation pieces are connected to a top end of the channels. In this embodiment, four heat dissipation pieces, namely, a first heat dissipation piece 721, a second heat dissipation piece 722, a third heat dissipation piece 723 and a fourth heat dissipation piece 724 are provided. Each of the heat dissipation pieces is composed of a connecting portion and a heat dissipation portion. A bottom end of the connecting portion is tightly connected with the top end of the channel. After an upper part of the connecting portion passes through the radial magnetic bearing stator cover 51 and the housing upper cover 1 in sequence, the heat dissipation portion is mounted at an end of the upper part of the connecting portion. The heat dissipation portion is located outside the housing. The radiator 71, the coolant 73 and the heat dissipation pieces constitute a radiator system 7.

Figure 6:
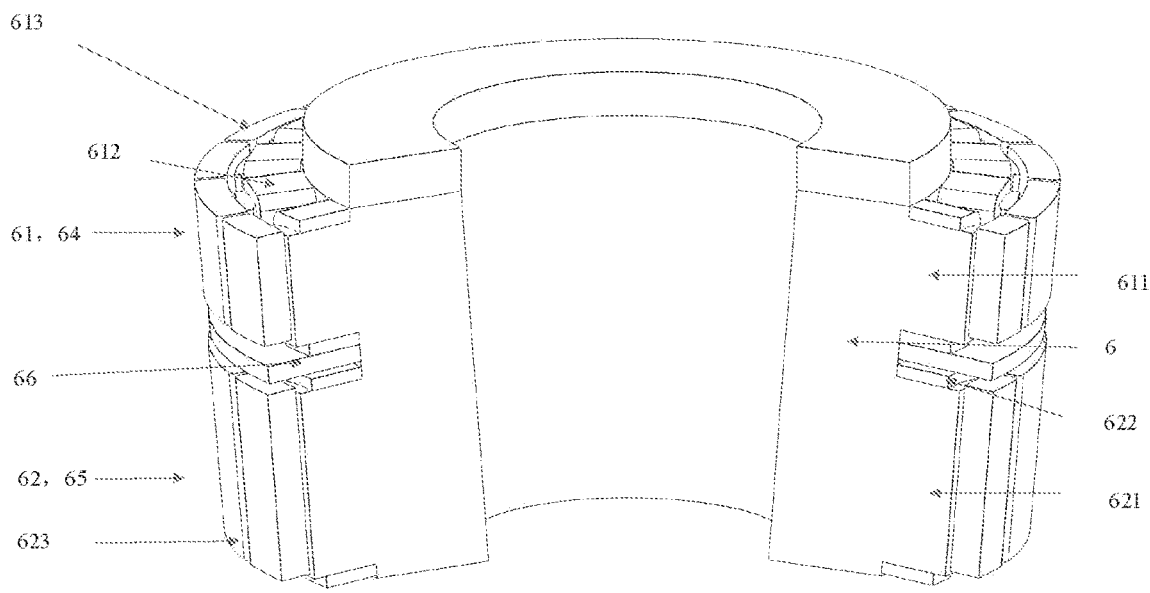
FIG. 6 is a schematic partial cross-sectional view of a flywheel motor in the first structure and the third structure of the vehicle-mounted magnetic suspension flywheel battery system according to the present disclosure.

Referring to FIG. 6, a stator yoke of a first flywheel motor 611, a magnetic isolation aluminum ring 66 and a stator yoke of a second flywheel motor 621 are mounted on an outer wall of the flywheel motor stator core 6 from top to bottom along an axial direction. A coil of the first flywheel motor 612 is tightly wound around an end portion of the stator yoke of the first flywheel motor 611, and a cone-shaped air gap exists between the coil of the first flywheel motor 612 and a permanent magnet of the first flywheel motor 613 along an axial direction. A coil of the second flywheel motor 622 is tightly wound around an end portion of the stator yoke of the second flywheel motor 621, and a cone-shaped air gap exists between the coil of the second flywheel motor 622 and a permanent magnet of the second flywheel motor 623 along an axial direction. An exterior of the permanent magnet of the first flywheel motor 613 and the permanent magnet of the second flywheel motor 623 is tightly connected to a flywheel motor system rotor yoke 41. The stator yoke of the first flywheel motor 611, the coil of the first flywheel motor 612 and the permanent magnet of the first flywheel motor 613 constitute the first flywheel motor 61, and the stator yoke of the second flywheel motor 621, the coil of the second flywheel motor 622 and the permanent magnet of the second flywheel motor 623 constitute the second flywheel motor 62. The first flywheel motor 61 and the second flywheel motor 62 have an identical radial air gap length, a rated power of the first flywheel motor 61 is less than that of the second flywheel motor 62, and a maximum starting torque can be outputted when the first flywheel motor 61 and the second flywheel motor 62 operate simultaneously. The first flywheel motor 61 and the second flywheel motor 62 both adopt a pole-slot configuration with 18 slots and 16 poles.

Figure 7:
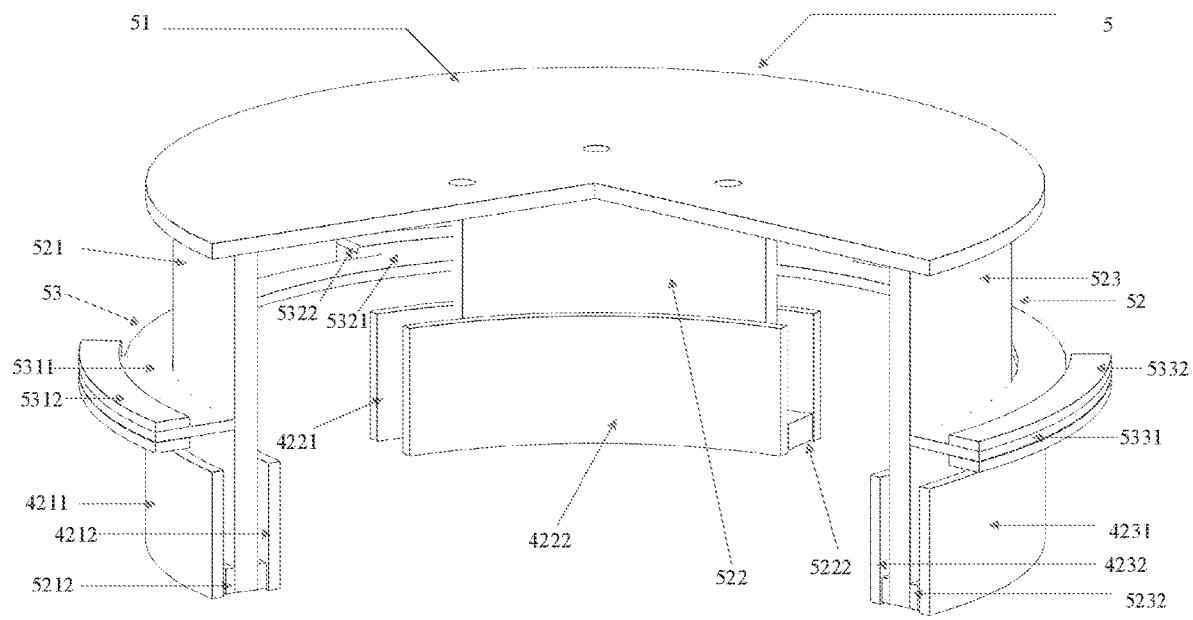
FIG. 7 is a schematic partial structural cross-sectional view of a flywheel radial magnetic bearing of the vehicle-mounted magnetic suspension flywheel battery according to the present disclosure.

As shown in FIG. 7, a radial magnetic bearing 5 includes the radial magnetic bearing stator cover 51, a radial Lorentz force magnetic bearing 52 and a radial magnetic resistance magnetic bearing 53. The radial Lorentz force magnetic bearing 52 is fixed below the radial magnetic bearing stator cover 51. The radial Lorentz force magnetic bearing 52 includes a first radial Lorentz force magnetic bearing stator yoke 521, a second radial Lorentz force magnetic bearing stator yoke 522 and a third radial Lorentz force magnetic bearing stator yoke 523. The first radial Lorentz force magnetic bearing stator yoke 521, the second radial Lorentz force magnetic bearing stator yoke 522 and the third radial Lorentz force magnetic bearing stator yoke 523 are evenly distributed along a circumferential direction and are fixed below the radial magnetic bearing stator cover 51. A first radial Lorentz force magnetic bearing control coil 5212, a second radial Lorentz force magnetic bearing control coil 5222 and a third radial Lorentz force magnetic bearing control coil 5232 are respectively fixed to the first radial Lorentz force magnetic bearing stator yoke 521, the second radial Lorentz force magnetic bearing stator yoke 522 and the third radial Lorentz force magnetic bearing stator yoke 523. A radial Lorentz force magnetic bearing permanent magnet is arranged outside each of the radial Lorentz force magnetic bearing control coils. An air gap is formed between the radial Lorentz force magnetic bearing permanent magnet and the corresponding radial Lorentz force magnetic bearing control coil. Specifically: A first radial Lorentz force magnetic bearing permanent magnet 4211 and a second radial Lorentz force magnetic bearing permanent magnet 4212 are arranged outside the first radial Lorentz force magnetic bearing control coil 5212. A third radial Lorentz force magnetic bearing permanent magnet 4221 and a fourth radial Lorentz force magnetic bearing permanent magnet 4222 are arranged outside the second radial Lorentz force magnetic bearing control coil 5222. A fifth radial Lorentz force magnetic bearing permanent magnet 4231 and a sixth radial Lorentz force magnetic bearing permanent magnet 4232 are arranged outside the third radial Lorentz force magnetic bearing control coil 5232. The first radial Lorentz force magnetic bearing permanent magnet 4211, the second radial Lorentz force magnetic bearing permanent magnet 4212, the third radial Lorentz force magnetic bearing permanent magnet 4221, the fourth radial Lorentz force magnetic bearing permanent magnet 4222, the fifth radial Lorentz force magnetic bearing permanent magnet 4231 and the sixth radial Lorentz force magnetic bearing permanent magnet 4232 are all fixedly mounted in a radial Lorentz force magnetic bearing mounting groove 421, referring to FIG. 2. As shown in FIG. 7, the radial magnetic resistance magnetic bearing 53 is fixed at a middle part of the first radial Lorentz force magnetic bearing stator yoke, the second radial Lorentz force magnetic bearing stator yoke, and the third radial Lorentz force magnetic bearing stator yoke. The radial magnetic resistance magnetic bearing 53 includes a first radial magnetic resistance magnetic bearing stator yoke 5311, a second radial magnetic resistance magnetic bearing stator yoke 5321 and a third radial magnetic resistance magnetic bearing stator yoke 5331. The first radial magnetic resistance magnetic bearing stator yoke 5311, the second radial magnetic resistance magnetic bearing stator yoke 5321 and the third radial magnetic resistance magnetic bearing stator yoke 5331 are arranged respectively corresponding to the first radial Lorentz force magnetic bearing stator yoke 521, the second radial Lorentz force magnetic bearing stator yoke 522 and the third radial Lorentz force magnetic bearing stator yoke 523. A first radial magnetic resistance magnetic bearing control coil 5312, a second radial magnetic resistance magnetic bearing control coil 5322 and a third radial magnetic resistance magnetic bearing control coil 5332 are respectively wound on an end portion of the first radial magnetic resistance magnetic bearing stator yoke 5311, an end portion of the second radial magnetic resistance magnetic bearing stator yoke 5321 and an end portion of the third radial magnetic resistance magnetic bearing stator yoke 5331. The radial magnetic resistance magnetic bearing 53 is located inside a radial magnetic resistance magnetic bearing mounting groove 42, and an air gap is formed between the radial magnetic resistance magnetic bearing 53 and the radial magnetic resistance magnetic bearing mounting groove 42.

As shown in FIG. 1 and FIG. 2, an axial magnetic bearing 8 includes a flywheel axial magnetic bearing stator yoke 81 and a flywheel axial passive magnetic bearing upper permanent magnet 82. The flywheel axial magnetic bearing stator yoke 81 is fixed below the flywheel motor stator core 6. A flywheel axial Lorentz force magnetic bearing stator yoke 811 is fixed on a central axis of the flywheel axial magnetic bearing stator yoke 81. A flywheel axial Lorentz force magnetic bearing control coil 812 is wound on the flywheel axial Lorentz force magnetic bearing stator yoke 811. The flywheel axial passive magnetic bearing upper permanent magnet 82 is embedded in a lower end of the flywheel axial magnetic bearing stator yoke 81. A flywheel axial passive magnetic bearing lower permanent magnet 44 is coaxially arranged below the flywheel axial passive magnetic bearing upper permanent magnet 82. The flywheel axial passive magnetic bearing lower permanent magnet 44 and the flywheel axial passive magnetic bearing upper permanent magnet 82 form a flywheel axial passive suction magnetic bearing. The flywheel axial passive magnetic bearing lower permanent magnet 44 is embedded in an axial passive magnetic bearing permanent magnet mounting groove 440. An axial Lorentz force magnetic bearing permanent magnet 431 is arranged outside the flywheel axial Lorentz force magnetic bearing control coil 812, and an air gap is formed between the flywheel axial Lorentz force magnetic bearing control coil 812 and the axial Lorentz force magnetic bearing permanent magnet 431. The axial Lorentz force magnetic bearing permanent magnet 431 is fixed on an inner wall of an axial Lorentz force magnetic bearing rotor yoke 43. The flywheel axial Lorentz force magnetic bearing control coil 812 and the axial Lorentz force magnetic bearing permanent magnet 431 constitute a flywheel axial Lorentz force magnetic bearing.

Referring to FIG. 2, a plurality of counterweight magnetic adsorption devices 45 are symmetrically embedded in a lower sphere of the flywheel 4. Each of the counterweight magnetic adsorption devices 45 includes a magnetic isolation sleeve, a permanent magnet, a spring and a resin cover. Only one set of magnetic isolation sleeve, permanent magnet, spring and resin cover is shown in the figure. A specific assembly method is as follows. A counterweight magnetic adsorption device magnetic isolation sleeve 4511 is embedded in the lower sphere of the flywheel 4. A counterweight magnetic adsorption device permanent magnet 4521 is arranged inside the counterweight magnetic adsorption device magnetic isolation sleeve 4511. A counterweight magnetic adsorption device spring 4531 is arranged at a lower end of the counterweight magnetic adsorption device permanent magnet 4521. An end portion of the counterweight magnetic adsorption device magnetic isolation sleeve 4511 is sealed by a counterweight magnetic adsorption device resin cover 4541. A flywheel axial Halbach passive magnetic bearing outer permanent magnet mounting groove 460 is arranged at a center of the lower sphere of the flywheel 4. A flywheel axial Halbach axial passive magnetic bearing outer permanent magnet 46 is mounted in the flywheel axial Halbach passive magnetic bearing outer permanent magnet mounting groove 460. A bottom end of the flywheel axial Halbach passive magnetic bearing outer permanent magnet 46 is even with a top end of a flywheel axial Halbach axial passive magnetic bearing inner permanent magnet 32. The flywheel axial Halbach axial passive magnetic bearing inner permanent magnet 32 is fixed on a top end of a flywheel axial Halbach passive magnetic bearing stator yoke 33. The flywheel axial Halbach passive magnetic bearing stator yoke 33 is coaxial with a central axis of the housing bottom cover 3. The flywheel axial Halbach axial passive magnetic bearing outer permanent magnet 46 and the flywheel axial Halbach axial passive magnetic bearing permanent magnet 32 constitute a flywheel axial Halbach axial passive magnetic bearing. A counterweight axial passive magnetic bearing lower permanent magnet 31 is mounted on an upper surface of a housing bottom cover 3. The counterweight axial passive magnetic bearing lower permanent magnet 31 and a counterweight axial passive magnetic bearing upper permanent magnet 91 are coaxial, with an air gap being formed therebetween. The counterweight axial passive magnetic bearing lower permanent magnet 31 and the counterweight axial passive magnetic bearing upper permanent magnet 91 constitute a counterweight axial passive magnetic bearing, so that the counterweight 9 is suspended. The counterweight axial passive magnetic bearing upper permanent magnet 91 is embedded in a counterweight axial passive magnetic bearing upper permanent magnet mounting groove 910 on a lower end surface of the counterweight 9. An upper universal spherical bearing 101 and a lower universal spherical bearing 102 are radially arranged on the counterweight 9, a radial air gap exists between the upper universal spherical bearing 101 and the counterweight 9, and a radial air gap exists between the lower universal spherical bearing 102 and the counterweight 9. The upper universal spherical bearing 101 and the lower universal spherical bearing 102 are arranged coaxially and are fixed on an inner wall of a lower end of the housing middle section 2. A spherical air gap exists between the counterweight 9 and the flywheel 4 along the axial direction.

An operating method of the radiator system 7 is as follows: In order to reduce the air friction on the flywheel 4, the housing upper cover 1, the housing middle section 2 and the housing bottom cover 3 form a vacuum environment. However, the vacuum environment is not conducive to the heat dissipation of the flywheel motor system. The ant-nest type channels inside the radiator 71 improve the fluidity of the coolant 73. According to the principle of thermal convection, the coolant 73 transfers heat in the channels to the outside of the housing through the heat dissipation pieces (the first heat dissipation piece 721, the second heat dissipation piece 722, the third heat dissipation piece 723 and the fourth heat dissipation piece 724).

Operating mode of the flywheel safety structure: The flywheel 4 can speed up very easily in the vacuum environment. When the rotational speed of the flywheel 4 reaches a warning speed, an over-speed failure will occur. In this case, the solenoid valve 121 is opened to destroy the vacuum environment in the housing cavity and increase the air resistance received by the flywheel 4, so as to slow the flywheel down quickly.

The posture of the counterweight 9 is stabilized in the following manner. When the counterweight 9 has not been adsorbed to the flywheel 4, the counterweight 9 is suspended on the housing bottom cover 3 under the action of the counterweight axial passive magnetic bearing, the upper universal spherical bearing 101 and the lower universal spherical bearing 102, and will be adsorbed after the flywheel 4 is accelerated. When the flywheel 4 decelerates and the counterweight 9 falls, the falling posture of the counterweight 9 is corrected by the upper universal spherical bearing 101 and the lower universal spherical bearing 102 to make the counterweight suspended at a safe position, so as to prevent the high rotational speed from causing an over-speed failure.

An operating method of the flywheel battery of this embodiment is as follows: The first flywheel motor 61 and the second flywheel motor 62 are used as permanent magnet synchronous motors. In this case, according to the braking strength and the value of the recovered energy power, the coil 612 of the first flywheel motor and the coil 622 of the second flywheel motor may be powered separately or simultaneously. When the flywheel battery system starts, the coil 612 of the first flywheel motor and the coil 622 of the second flywheel motor are powered at the same time, to obtain a maximum starting torque. When a recovered energy power is less than a rated power of the first flywheel motor 61, the coil 612 of the first flywheel motor 61 is powered alone. When the recovered energy power is greater than the rated power of the first flywheel motor 61 and less than a rated power of the second flywheel motor 62, the coil 622 of the second flywheel motor is powered alone. When the recovered energy power is greater than the rated power of the second flywheel motor 62, the coil 612 of the first flywheel motor and the coil 622 of the second flywheel motor are powered at the same time. The first flywheel motor 61 and the second flywheel motor 62 can operate independently or simultaneously, so as to meet the operation requirements of the charging operation mode and reduce the operation loss of the flywheel motor system. The charging mode mostly occurs when the vehicle is under a driving condition such as braking or driving downhill, in which case the flywheel suffers from great disturbance. To accurately suppress the disturbance and reduce the control loss, the low-loss radial magnetic resistance magnetic bearing control coil (including the first radial magnetic resistance magnetic bearing control coil 5312, the second radial magnetic resistance magnetic bearing control coil 5322 and the third radial magnetic resistance magnetic bearing control coil 5332) are powered throughout the whole process, so as to coarsely suppress the disturbance. The radial Lorentz force magnetic bearing control coil with high loss but high control precision (including the first radial Lorentz force magnetic bearing control coil 5212, the second radial Lorentz force magnetic bearing control coil 5222 and the third radial Lorentz force magnetic bearing control coil 5232) is intermittently powered according to the disturbance intensity. In the axial direction, the flywheel axial passive suction magnetic bearing and the flywheel axial Lorentz force magnetic bearing operate in cooperation with each other. The axial passive suction magnetic bearing overcomes the mass of the flywheel 4. The flywheel axial Lorentz force magnetic bearing control coil 812 is intermittently powered according to the disturbance intensity.

Embodiment 2

The structure of this embodiment is used when the vehicle-mounted magnetic suspension flywheel battery operates in a standby mode.

Figure 3:
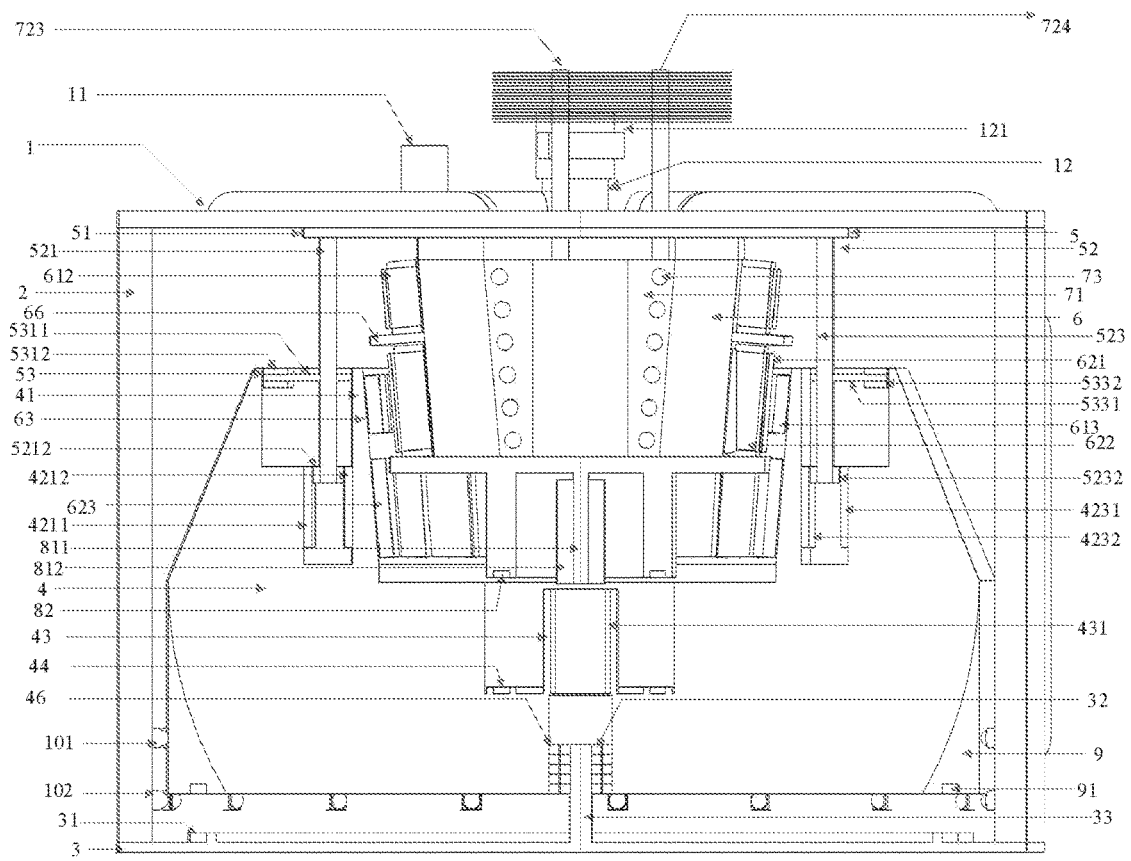
FIG. 3 is a cross-sectional view of a second structure of the vehicle-mounted magnetic suspension flywheel battery system according to the present disclosure.
Figure 4:
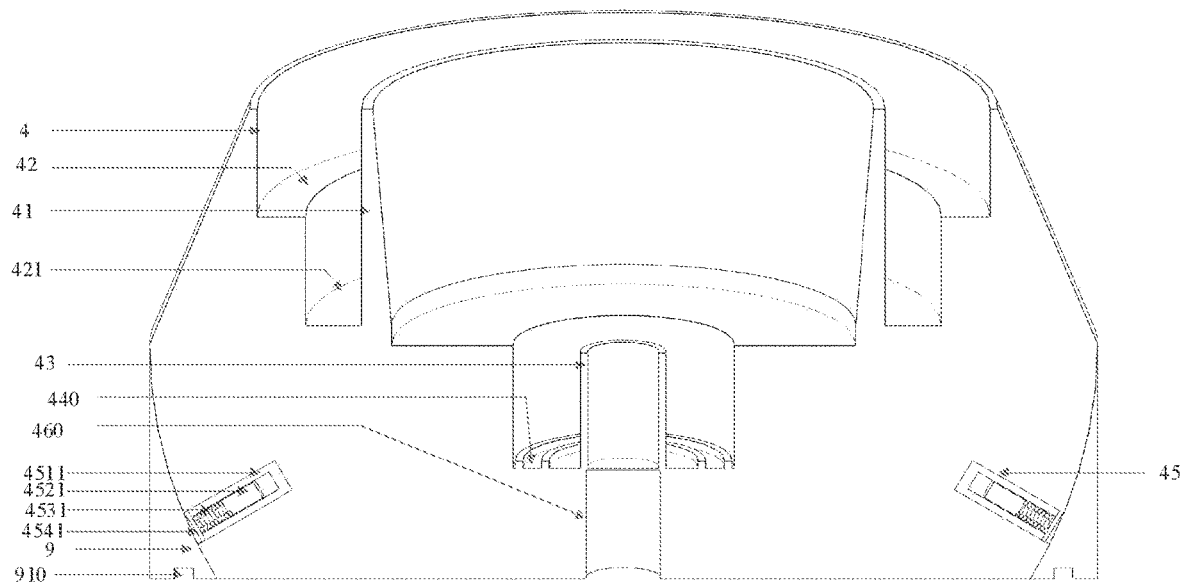
FIG. 4 is a partial structural diagram of a flywheel and a counterweight in the second structure of the vehicle-mounted magnetic suspension flywheel battery system according to the present disclosure.

As shown in FIG. 3 and FIG. 4, different from Embodiment 1, the structures of the first flywheel motor 61 and the second flywheel motor 62 are changed in this embodiment. The stator yoke of the first flywheel motor 611, the magnetic isolation aluminum ring 66 and the stator yoke of the second flywheel motor 621 are mounted on the outer wall of the flywheel motor stator core 6 from top to bottom along the axial direction. The coil of the first flywheel motor 612 is tightly wound around an end portion of the stator yoke of the first flywheel motor 611. The coil of the second flywheel motor 622 is tightly wound around an end portion of the stator yoke of the second flywheel motor 621. The permanent magnet of the first flywheel motor 613 and the coil of the second flywheel motor 622 are axially coupled in the axial direction, and have a cone-shaped air gap in the radial direction. The flywheel motor composed of the coil of the second flywheel motor 622, the stator yoke of the second flywheel motor 621 and the permanent magnet of the first flywheel motor 613 is defined as a third flywheel motor 63.

The spherical air gap between the counterweight 9 and the flywheel 4 in the axial direction disappears, and the counterweight 9 and the flywheel 4 are closely attached to each other. The flywheel axial Lorentz force magnetic bearing control coil 812 is not axially coupled with the axial Lorentz force magnetic bearing permanent magnet 431 (i.e., the flywheel axial Lorentz force magnetic bearing fails).

An operating method of the flywheel battery of this embodiment is as follows: The rotational speed of the flywheel 4 exceeds a counterweight capture speed. According to $F=m\omega^2 r$ (where F represents centrifugal force, m represents mass, $\omega$ represents angular velocity, and r represents radius), it can be seen that the centrifugal force received by the counterweight magnetic adsorption device permanent magnet is greater than the repulsive force of the counterweight magnetic adsorption device spring, the counterweight magnetic adsorption device permanent magnet moves toward the counterweight magnetic adsorption device resin cover, the magnetic force received by the counterweight 9 increases, and the counterweight passive magnetic bearing in Embodiment 1 fails. The counterweight 9 is drawn to a bottom end of the flywheel 4 by the counterweight magnetic adsorption device 45, so that a balanced state of the flywheel axial passive magnetic bearing and the flywheel axial Lorentz force magnetic bearing is broken, and the flywheel 4 and the counterweight (9) move downward as a whole. In this case, the flywheel axial Halbach axial passive magnetic bearing operates to balance the flywheel battery in the axial direction and change the shape of the flywheel motor system to the third flywheel motor 63. Compared with the first flywheel motor 61 and the second flywheel motor 62, the third flywheel motor 63 increases the air gap and reduces the coupling area between the permanent magnet of the third flywheel motor (i.e., the permanent magnet of the second flywheel motor 613) and the coil of the third flywheel motor (i.e., the coil of the second flywheel motor 622). The third flywheel motor in the standby mode can use flux weakening and reduce the loss. In the standby mode, the flywheel 4 receives little disturbance. In order to achieve the purpose of low-loss operation, the low-loss radial magnetic resistance magnetic bearing control coil (including the first radial magnetic resistance magnetic bearing control coil 5312, the second radial magnetic resistance magnetic bearing control coil 5322 and the third radial magnetic resistance magnetic bearing control coil 5332) are powered throughout the whole process, so as to suppress the disturbance. The high-loss radial Lorentz force magnetic bearing control coil (including the first radial Lorentz force magnetic bearing control coil 5212, the second radial Lorentz force magnetic bearing control coil 5222 and the third radial Lorentz force magnetic bearing control coil 5232) is not powered. Only the flywheel Halbach axial passive magnetic bearing is used in the axial direction.

Embodiment 3

The structure of this embodiment is used when the vehicle-mounted magnetic suspension flywheel battery operates in a discharging mode.

Figure 5:
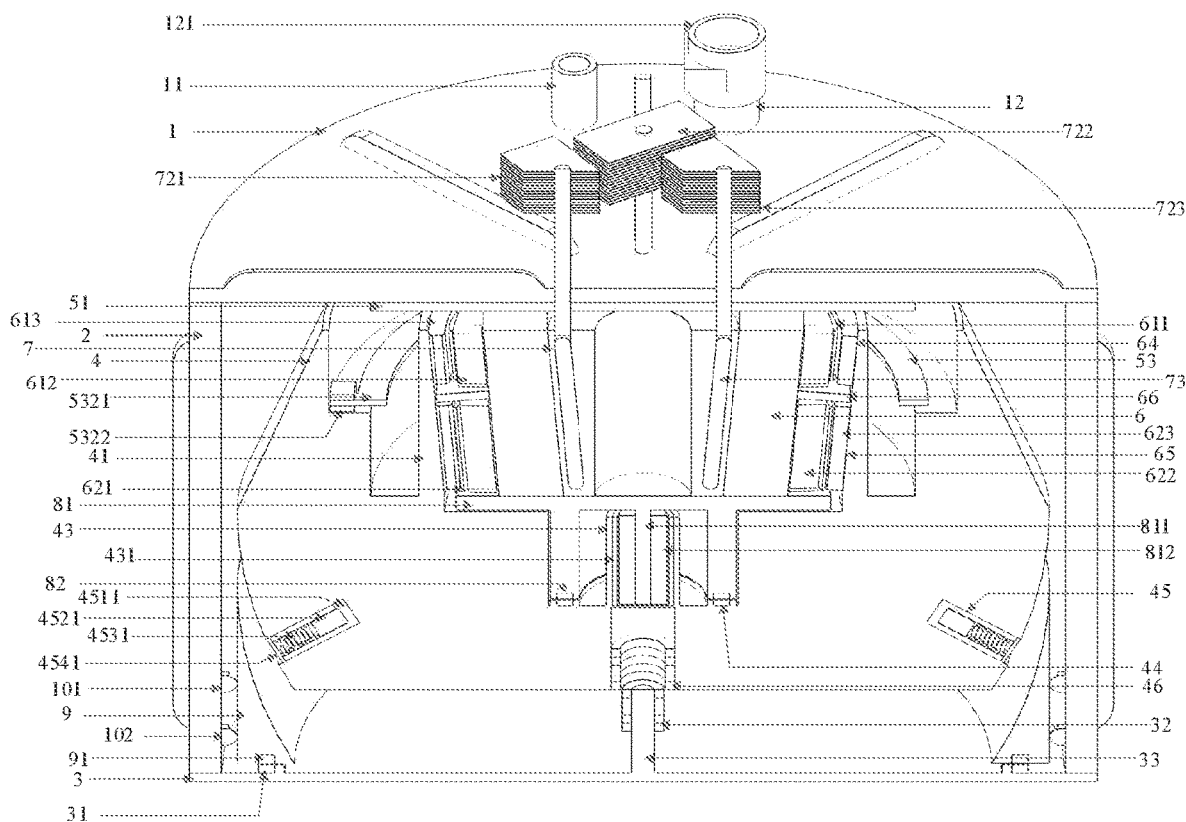
FIG. 5 is a cross-sectional view of a third structure of the vehicle-mounted magnetic suspension flywheel battery system according to the present disclosure.

As shown in FIG. 5, the structure of the structure self-adjusting type flywheel battery coping with multiple operation modes of this embodiment is the same as that of Embodiment 1. The coil of the first flywheel motor 612 and the coil of the second flywheel motor 622 output energy to convert the mechanical energy into electrical energy. In this case, the first flywheel motor 61 is used as a first flywheel generator 64, and the second flywheel motor 62 is used as a second flywheel generator 65. The first flywheel generator 64 and the second flywheel generator 65 have an identical radial air gap length, and an output voltage level of the first flywheel generator 64 is lower than that of the second flywheel generator 65.

In the discharging mode, to convert the mechanical energy stored in the flywheel 4 into electrical energy, the rotational speed of the flywheel 4 will decrease. When the rotational speed of the flywheel 4 is less than the counterweight capture speed, it can be seen according to $F=m\omega^2 r$ that the centrifugal force received by the counterweight magnetic adsorption device permanent magnet is less than the repulsive force of the counterweight magnetic adsorption device spring, the counterweight magnetic adsorption device permanent magnet moves toward the top end of the inner wall of the counterweight magnetic adsorption device magnetic isolation sleeve, the magnetic force received by the counterweight 9 decreases, and the counterweight 9 is released from the bottom end of the flywheel 4 by the counterweight magnetic adsorption device 45, so that a balanced state of the flywheel Halbach axial passive magnetic bearing is broken. Due to the inertia and as the axial Lorentz force magnetic bearing control coil 812 is powered, the flywheel 4 moves upward to restore the axial balance in Embodiment 1. In this case, the first flywheel generator 64 and the second flywheel generator 65 in the flywheel motor system are used as permanent magnet synchronous generators. The first flywheel generator 64 and the second flywheel generator 65 have different output voltage levels, which can be input to a control circuit and a traction system in the electric vehicle. The discharging mode mostly occurs when the vehicle is under a vehicle driving condition such as accelerating or driving uphill, in which case the flywheel 4 suffers from great disturbance. To suppress the disturbance and achieve low-loss operation, the operation mode of the magnetic bearing system in this case is the same as that in the charging mode.

The embodiments are preferred embodiments of the present disclosure, but the present disclosure is not limited to the above-mentioned embodiments. Without departing from the spirit of the present disclosure, any obvious improvement, replacement or variation that can be made by the person skilled in the art belongs to the protection scope of the present disclosure.

What is claimed is:

1. A structure self-adjusting type vehicle-mounted flywheel battery coping with multiple operation modes, comprising a vacuum housing, wherein a radiator, a flywheel axial magnetic bearing stator yoke, a flywheel, and a counterweight are sequentially arranged inside the vacuum housing from top to bottom;

an ant-nest type channel is formed in the radiator along a circumferential direction, a coolant is stored in the channel, an upper part of the channel is connected with a heat dissipation piece, and an end of the heat dissipation piece is arranged outside the vacuum housing;

a plurality of counterweight magnetic adsorption devices are symmetrically embedded in a lower sphere of the flywheel, each of the counterweight magnetic adsorption devices comprises a magnetic isolation sleeve, a permanent magnet, a spring and a resin cover, the magnetic isolation sleeve is embedded in the lower sphere of the flywheel, the permanent magnet is arranged inside the magnetic isolation sleeve, the spring is arranged at a lower end of the permanent magnet, and the magnetic isolation sleeve is sealed by the resin cover;

a counterweight axial passive magnetic bearing lower permanent magnet is mounted on an upper surface of a bottom cover of the vacuum housing, the counterweight axial passive magnetic bearing lower permanent magnet and a counterweight axial passive magnetic bearing upper permanent magnet are coaxial and are spaced apart from each other, and the counterweight axial passive magnetic bearing lower permanent magnet and the counterweight axial passive magnetic bearing upper permanent magnet constitute a counterweight axial passive magnetic bearing;

a flywheel motor stator core is coaxially arranged outside the radiator, a motor is arranged on the flywheel motor stator core, and a radial magnetic resistance magnetic bearing and a radial Lorentz force magnetic bearing are arranged inside the flywheel;

a flywheel axial Lorentz force magnetic bearing stator yoke is fixed on a central axis of the flywheel axial magnetic bearing stator yoke, a flywheel axial Lorentz force magnetic bearing control coil is wound on the flywheel axial Lorentz force magnetic bearing stator yoke, and the flywheel axial Lorentz force magnetic bearing control coil and an axial Lorentz force magnetic bearing permanent magnet constitute a flywheel axial Lorentz force magnetic bearing;

a flywheel axial passive magnetic bearing upper permanent magnet is embedded in a lower end of the flywheel axial magnetic bearing stator yoke, and the flywheel axial passive magnetic bearing upper permanent magnet and the flywheel axial passive magnetic bearing lower permanent magnet constitute a flywheel axial passive suction magnetic bearing; and a flywheel axial Halbach axial passive magnetic bearing is mounted in a center of the bottom cover of the vacuum housing.

2. The structure self-adjusting type vehicle-mounted flywheel battery according to claim 1, wherein the motor is a first flywheel motor and a second flywheel motor, and internal air gaps of the first flywheel motor and the second flywheel motor are cone-shaped; and the first flywheel motor and the second flywheel motor have an identical radial air gap length, and a rated power of the first flywheel motor is less than that of the second flywheel motor.

3. The structure self-adjusting type vehicle-mounted flywheel battery according to claim 2, wherein a permanent magnet of the first flywheel motor and a coil of the second flywheel motor are axially coupled in an axial direction, and have a cone-shaped air gap in a radial direction.

4. An operating method of the structure self-adjusting type vehicle-mounted flywheel battery according to claim 3, comprising:

drawing the counterweight to a bottom end of the flywheel by the counterweight magnetic adsorption device, so that a balanced state of the flywheel axial passive magnetic bearing and the flywheel axial Lorentz force magnetic bearing is broken, and the flywheel fall with the counterweight; at this moment the flywheel axial Halbach axial passive magnetic bearing operating to balance the flywheel battery in the axial direction; and powering a control coil of the radial magnetic resistance magnetic bearing continuously, and not powering a control coil of the radial Lorentz force magnetic bearing.

5. An operating method of the structure self-adjusting type vehicle-mounted flywheel battery according to claim 2, comprising:

powering a coil of the first flywheel motor and a coil of the first flywheel motor at the same time when a flywheel battery system starts, to obtain a maximum starting torque;

powering the coil of the first flywheel motor alone when a recovered energy power is less than the rated power of the first flywheel motor;

powering the coil of the second flywheel motor alone when the recovered energy power is greater than the rated power of the first flywheel motor and less than the rated power of the second flywheel motor;

powering the coil of the first flywheel motor and the coil of the second flywheel motor at the same time when the recovered energy power is greater than the rated power of the second flywheel motor;

powering a control coil of the radial magnetic resistance magnetic bearing continuously, and powering a control coil of the radial Lorentz force magnetic bearing intermittently according to a disturbance intensity; and the flywheel axial passive suction magnetic bearing and the flywheel axial Lorentz force magnetic bearing operating in cooperation with each other.

6. The structure self-adjusting type vehicle-mounted flywheel battery according to claim 1, wherein the motor is a first flywheel generator and a second flywheel generator, and internal air gaps of the first flywheel generator and the second flywheel generator are cone-shaped; and the first flywheel generator and the second flywheel generator have an identical radial air gap length, and an output voltage level of the first flywheel generator is lower than that of the second flywheel generator.

7. An operating method of the structure self-adjusting type vehicle-mounted flywheel battery according to claim 6, comprising:

releasing the counterweight from a bottom end of the flywheel by the counterweight magnetic adsorption device, so that a balanced state of the flywheel Halbach axial passive magnetic bearing is broken, and the flywheel moves upward to restore an axial balance;

outputting energy of different voltage levels to a vehicle control circuit and a traction system by the first flywheel generator and the second flywheel generator respectively;

powering a control coil of the radial magnetic resistance magnetic bearing continuously, and powering a control coil of the radial Lorentz force magnetic bearing intermittently according to a disturbance intensity; and the flywheel axial passive suction magnetic bearing and the flywheel axial Lorentz force magnetic bearing operating in cooperation with each other.

8. The structure self-adjusting type vehicle-mounted flywheel battery according to claim 1, wherein an upper universal spherical bearing and a lower universal spherical bearing are radially arranged on the counterweight, a radial air gap exists between the upper universal spherical bearing and the counterweight, and a radial air gap exists between the lower universal spherical bearing and the counterweight.

9. The structure self-adjusting type vehicle-mounted flywheel battery according to claim 1, wherein an upper cover of the vacuum housing is provided with a vacuum pumping pipeline and an air intake pipeline, and a solenoid valve is mounted at the air intake pipeline.

* * * * *